United States Patent [19]

Kohl

[11] Patent Number: 4,525,470
[45] Date of Patent: Jun. 25, 1985

[54] CATALYST COMPOSITIONS FOR PREPARING POLYORGANOSILOXANES

[75] Inventor: Charles F. Kohl, Midland, Mich.

[73] Assignee: Dow Corning Corporation, Midland, Mich.

[21] Appl. No.: 638,598

[22] Filed: Aug. 7, 1984

Related U.S. Application Data

[62] Division of Ser. No. 519,357, Aug. 1, 1983.

[51] Int. Cl.$^3$ .................. B01J 31/02; C08G 77/06
[52] U.S. Cl. ................................ 502/167; 502/168
[58] Field of Search .............. 528/21, 23; 524/860; 502/167, 168

[56] References Cited

U.S. PATENT DOCUMENTS

| | | | |
|---|---|---|---|
| 3,155,634 | 11/1964 | Pike | 528/198 |
| 3,160,601 | 12/1964 | Hyde | 528/23 |
| 3,280,071 | 10/1966 | Beck | 556/454 |
| 3,298,997 | 1/1967 | Holbrook | 528/23 |
| 3,308,203 | 3/1967 | Metevia et al. | 502/167 |
| 3,647,740 | 3/1972 | Loree et al. | 528/21 |
| 3,843,702 | 10/1974 | deMontigny et al. | 556/455 |
| 4,431,771 | 2/1984 | Falender et al. | 524/863 |
| 4,482,670 | 11/1984 | Saam et al. | 524/860 |

FOREIGN PATENT DOCUMENTS 1325654 8/1973 United Kingdom .

*Primary Examiner*—P. E. Konopka
*Attorney, Agent, or Firm*—Robert Spector

[57] ABSTRACT

Polyorganosiloxanes are prepared from at least one organosiloxane reactant containing an average of more than one silicon-bonded hydroxyl group per molecule using novel catalyst compositions consisting essentially of (1) at least one salt formed from equimolar amounts of an amine and sulfuric acid, phosphoric acid, a carboxylic acid or an organosulfonic acid and (2) an unreacted acid selected from the group consisting of sulfuric acid and fluorinated alkanesulfonic acids.

9 Claims, No Drawings

CATALYST COMPOSITIONS FOR PREPARING POLYORGANOSILOXANES

This application is a division of application Ser. No. 519,357, filed 8/1/83.

BACKGROUND OF THE INVENTION

1. Field of the Invention

This invention relates to the preparation of polyorganosiloxanes. More particularly, this invention relates to a method and certain novel catalyst compositions for preparing polyorganosiloxanes from one or more organosiloxanes containing silicon-bonded hydroxyl groups.

2. Description of the Prior Art

Polyorganosiloxanes are well known materials, and range in consistency from liquids to resinous or elastomeric solids at room temperature. The physical state of a given polyorganosiloxane is a function of its molecular weight and the type and number of hydrocarbon groups bonded to silicon.

Polyorganosiloxanes have been prepared by a variety of methods. In accordance with one such method, one or more silanes or siloxanes containing silicon-bonded hydroxyl groups are reacted in the presence of suitable condensation catalysts. U.S. Pat. No. 3,308,203, which issued to Metevia and Polmanteer on Mar. 7, 1967, discloses several classes of compounds that catalyze the condensation of silicon-bonded hydroxyl groups. Among the classes of catalysts disclosed are alkali metal hydroxides, organosilicon salts of alkali metal hydroxides, primary, secondary and tertiary amines, aromatic sulfonic acids, fluoroalkanesulfonic acids, and salts obtained by the reaction of "basic amino compounds" with either phosphoric acid or carboxylic acids. The aforementioned patent teaches that these catalysts do not cause excessive siloxane bond rearrangement, and are therefore useful for preparing organosiloxane block copolymers.

Applicant has found that some of the preferred catalysts exemplified in the aforementioned patent either will not produce polyorganosiloxanes of sufficiently high molecular weight to yield elastomers and resins having commercially useful physical properties, or the catalysts must be used in such large concentrations that they adversely affect the physical or chemical properties of the final cured polyorganosiloxane.

An additional problem associated with using many prior art catalysts is that in addition to accelerating the reaction between two silicon-bonded hydroxyl groups to form =SiOSi= bonds, at the required use levels the catalysts may accelerate a hydrolysis of previously formed silicon-oxygen bonds. This can result in the formation of cyclic organosiloxane oligomers and a reduction in the average molecular weight of the polymer. The cyclic organosiloxanes typically have relatively low boiling points and are readily distilled from the reaction mixture together with the liquid hydrocarbon often employed as a reaction medium. The formation of cyclic organosiloxanes place an upper limit on the average molecular weight that can be achieved under a given set of conditions. In addition, the rearrangement and equilibration of siloxane bonds could destroy the alternating sequences of repeating units that characterize the structure of block copolymers.

An objective of this invention is to provide a method and novel catalyst compositions for preparing high molecular weight polyorganosiloxanes, including block copolymers, by a condensation reaction between one or more hydroxyl-containing polyorganosiloxanes. An additional objective is to provide novel catalysts for the reaction between silicon-bonded hydroxyl groups that are effective at concentration levels which do not adversely affect electrical and other properties of the resultant polymer.

SUMMARY OF THE INVENTION

The foregoing objectives and others can be achieved by the present method for preparing polyorganosiloxanes, which comprises reacting one or more hydroxyl-containing organosiloxanes in the presence of an inert liquid reaction medium and a catalytically effective amount of a novel catalyst composition consisting essentially of an acid selected from sulfuric acid and fluorinated alkanesulfonic acids, and a salt derived from an organic amine containing at least one primary, secondary or tertiary nitrogen atom and an acid selected from the group consisting of carboxylic acids, sulfuric acid, organosulfonic acids, and phosphoric acid.

DETAILED DESCRIPTION OF THE INVENTION

The invention provides a method for preparing a polyorganosiloxane, said method comprising the steps of (I) forming a liquid reaction mixture comprising (A) at least one hydroxyl-containing organosiloxane reactant containing repeating units of the formula $R_a^1SiO_{4-a}$ where each $R^1$ is individually selected from the group consisting of monovalent inertly substituted and monovalent unsubstituted hydrocarbon radicals containing from 1 to 6 carbon atoms and a has an average value of from 1 to 2; (B) a catalytically effective amount of a catalyst composition consisting essentially of (1) at least one salt derived from substantially equivalent amounts of an organic mono- or polyfunctional amine and an acid selected from the group consisting of mono- and polyfunctional carboxylic acids, mono- and polyfunctional organosulfonic acids, phosphoric acid and sulfuric acid, and (2) at least one unreacted acid selected from the group consisting of fluorinated alkanesulfonic acids and sulfuric acid, and (C) an inert liquid reaction medium; (II) heating said reaction mixture at a temperature of from 30° C. to the boiling point of the reaction mixture while removing the by-produced water from the reaction mixture; and (III) maintaining said temperature for a period of time sufficient to form said polyorganosiloxane.

In a preferred embodiment of this invention, the polyorganosiloxane is a block copolymer prepared by reacting (i) a hydroxyl-terminated polydiorganosiloxane having repeating units of the general formula $R^2R^3SiO$, where $R^2$ and $R^3$ are individually selected from the same group as $R^1$, with (ii) an organosiloxane containing units of the formula

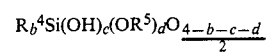

$$R_b^4Si(OH)_c(OR^5)_dO_{\frac{4-b-c-d}{2}}$$

where $R^4$ is selected from the group defined hereinbefore for $R^1$, with the proviso that $R^2$, $R^3$ and $R^4$ are not identical when b is 2; $R^5$ is alkyl containing from 1 to 4 carbon atoms; b has an average value of from 1 to 2, inclusive; c is at least 0.01; d has an average value of from 0 to 1.5, the sum of b, c and d does not exceed 3; and the molar ratio of $R^2R^3SiO$ units to

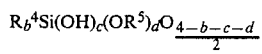

is from 0.1:1 to 10:1, respectively.

This invention also provides novel catalyst compositions for preparing polyorganosiloxanes by the condensation reaction of at least one organosiloxane containing an average of more than one silicon-bonded hydroxyl group per molecule. The catalyst compositions contain at least one each of the salts and unreacted acids previously defined herein in connection with the method of this invention.

The catalyst compositions employed in accordance with the present method make it possible to reproducibly prepare polyorganosiloxanes exhibiting commercially useful levels of physical properties such as tensile strength and elongation. An additional advantage of the present catalyst compositions is that they can be employed at sufficiently small concentrations which do not adversely affect the electrical and other properties of the final block copolymer. Preferred catalyst compositions will not excessively corrode metal reactors and associated processing equipment.

The amine salt component (1) of the present catalyst compositions is the reaction product of an organic amine containing at least one primary, secondary or tertiary nitrogen atom with a substantially equivalent amount of a carboxylic acid, an organosulfonic acid, sulfuric acid, or phosphoric acid. As defined for purposes of the present invention, organic amines contain no active hydrogen atoms other than those forming part of the amine group, and the term "equivalent amount" refers to that amount of acid sufficient to react with all of the amino groups without any excess sulfuric acid, phosphoric acid, —COOH or —SO$_3$H groups being present in the reaction product.

Specific examples of suitable amines include aliphatic primary, secondary and tertiary amines such as methylamine, diethylamine, n-propylamine, tri-n-propylamine, di-iso-propylamine, n-butylamine, t-butylamine and di-n-octylamine; cycloaliphatic amines such as cyclohexylamine; aromatic amines such as aniline and heterocyclic amines such as pyridine and pyrrole. Suitable polyfunctional amines include ethylenediamine, diethylenetriamine, pyrimidine, guanidine, and N-alkylated guanidines. Preferably, the amine is either a monoalkylamine containing from 1 to 8 carbon atoms, most preferably t-butylamine, or a 1,1,3,3-tetraalkylguanidine wherein the alkyl radicals of the amine contain from 1 to 8 carbon atoms. Most preferably the tetraalkylguanidine is 1,1,3,3-tetramethylguanidine, hereinafter referred to as tetramethylguanidine. The preference for certain amines is based on their availability and the properties of polymers prepared using salts of these amines.

The acid employed to prepare the amine salt can be sulfuric acid, phosphoric acid, a mono- or polyfunctional carboxylic acid or a mono- or polyfunctional organosulfonic acid. The hydrocarbon portion of the carboxylic or organosulfonic acid can be unsubstituted or inertly substituted, and contains from 1 to 20 or more carbon atoms. The substituents that can be present include alkoxy groups and halogen atoms. Examples of suitable carboxylic acids include acetic, methoxyacetic, trifluoroacetic, propionic, butyric, n-hexanoic, adipic, 2-ethylhexanoic, octanoic, suberic, decanoic, stearic, oleic, benzoic, p-chlorobenzoic, benzoic and the isomeric phthalic acids. Examples of suitable organosulfonic acids are methanesulfonic, ethanesulfonic, n-butanesulfonic, benzenesulfonic and p-toluenesulfonic acids. Preferred acids include sulfuric acid and carboxylic and organosulfonic acids containing at least one halogen atom on the hydrocarbon radical. The halogen is most preferably fluorine and is present as a polyfluorinated alkyl radical. Preferred fluorine-containing acids include trifluoroacetic acid, trifluoromethanesulfonic acid, and tetrafluoroethanesulfonic acid. Fluorinated sulfonic acids are most preferred based on the small salt concentrations required and the properties of polyorganosiloxanes obtained using salts of these acids as catalysts.

Methods for preparing salts by the reaction of an organic amine with an equivalent amount of a suitable carboxylic acid, organosulfonic acid, sulfuric acid, or phosphoric acid are thoroughly discussed in the chemical literature, and are not part of this invention.

The salt component (1) of the present catalyst compositions is typically employed at a concentration of from about 10 to about 500 parts by weight per million parts (ppm) of total organosiloxane reactants. The optimum concentration range for a given salt is a function of several factors, including the catalytic activity of the salt, its thermal stability and the boiling points of the amine and acid components of the salt. It is therefore not feasible to define preferred concentration limits for every operable salt, however these can be readily determined with a minimum of experimentation.

The preferred sulfuric, trifluoroacetic, and trifluoromethanesulfonic acid salts of lower N-alkyl amines, such as t-butyl amine and tetramethylguanidine, are employed at concentration levels of from 50 to 200 ppm.

In some instances it may be necessary to add one or both of the acid and amine portions of the salt during the polymerization reaction to replace material lost by decomposition of the salt and subsequent distillation of the acid and/or amine portion of the salt together with the water formed as a by-product of the reaction.

The presence of sufficient catalyst during the polymerization can readily be determined by periodically determining the molecular weight of the polymer using any of the known techniques, including viscosity measurement, gel permeation chromatography and osmometry.

In addition to the aforementioned salt (1), the present catalyst compositions also contain an unreacted acid component (2), that is either sulfuric acid or a fluoroalkanesulfonic acid. Preferably the fluoroalkanesulfonic acid is represented by the formula $R_fSO_3H$ where $R_f$ represents a perfluoroalkyl radical containing from 1 to 12 carbon atoms, a $H(CF_2)_dCF_2$— radical, or a $F(CF_2)_dCFHCF_2$— radical and d is 0, 1 or 2. Fluoroalkanesulfonic acids corresponding to these formulae include $CF_3SO_3H$, $C_2F_5SO_3H$, $C_4F_9SO_3H$, $C_8F_{17}SO_3H$, $HCF_2CF_2SO_3H$, $CF_2HSO_3H$ and $CF_3CFHCF_2SO_3H$. Preferably $R_f$ represents a lower perfluoroalkyl group, most preferably trifluoromethyl, or $R_f$ represents $HF_2CCF_2$—. The unreacted acid is present at a concentration which is catalytically effective for the condensation of silicon-bonded hydroxyl groups. Typically, the fluoroalkanesulfonic acid or sulfuric acid is present at concentrations of from 10 to 300 ppm.

In some instances the unreacted acid appears to catalyze a hydrolysis of silicon-oxygen bonds to form lower molecular weight, hydroxyl-terminated polyorganosiloxanes. For example, when preparing block copolymers from a polydimethylsiloxane and hydrolyzed phenyltrimethoxysilane, it has been found that the dimethylsiloxane portions of the final copolymer are of equivalent molecular weights, irrespective of the molecular weight of the initial polydimethylsiloxane used to prepare the copolymer. It has also been found that copolymers can be prepared using trimethylsiloxy-endblocked polydimethylsiloxanes as one of the two reactants. This indicates that some hydrolysis to form hydroxyl-containing reactants is occurring concurrently with copolymer formation.

Surprisingly, the aforementioned hydrolysis does not affect the phenylsiloxane portion of the copolymer, nor does it appear to adversely affect the ordered structure of the final block copolymer, as evidenced by the physical properties of the cured copolymer.

The weight ratio of amine salt component to unreacted acid component of the present catalyst compositions is from 1:30 to 50:1, respectively. Preferably this ratio is from 1:3 to 3:1.

The organosiloxane reactants employed to prepare polyorganosiloxanes in accordance with the present method contain an average of more than one, preferably two or more silicon-bonded hydroxyl groups per molecule. When the final polyorganosiloxane is a homopolymer, the organosiloxane reactant preferably contains an average of at least 1.8 silicon-bonded hydroxyl groups per molecule.

The organosiloxane reactants are typically low molecular weight, hydroxylated polyorganosiloxanes containing an average of two or more repeating siloxane units per molecule than can be represented by the aforementioned general formula $R_a^1SiO_{(4-a)/2}$ where each $R^1$ is individually selected from the group consisting of monovalent inertly substituted and monovalent unsubstituted hydrocarbon radicals containing from 1 to 6 carbon atoms and a has an average value of from 1 to 2.

Representative unsubstituted monovalent hydrocarbon radicals include alkyl such as methyl, ethyl, propyl, butyl, and hexyl; alkenyl such as vinyl; cycloalkyl such as cyclohexyl; and aryl such as phenyl. When $R^1$ represents an acyclic hydrocarbon radical it can be linear or branched. When $R^1$ represents an inertly substituted hydrocarbon radical, the substituent can be, for example, halogen, alkoxy or cyano. These substituents are considered inert, in that they do not react under the conditions employed to polymerize the siloxane reactants.

Preferably $R^1$ represents methyl, phenyl or 3,3,3-trifluoropropyl. This preference is based on the availability of intermediates employed to prepare the siloxane reactants.

As disclosed hereinbefore, a hydroxyl-containing diorganosiloxane reactant can be formed in situ during the polymerization reaction from a trihydrocarbylsiloxy-endblocked polydiorganosiloxane and sufficient water to hydrolyze a portion of the silicon-oxygen bonds of the polydiorganosiloxane.

Preferred siloxane reactants for preparing homopolymers include low molecular weight hydroxyl-terminated polydiorganosiloxanes containing an average of from 10 to about 100 repeating units per molecule. In these embodiments $R_a^1SiO_{(4-a)/2}$ represents a dimethylsiloxane, methylvinylsiloxane, methylphenylsiloxane or a methyl-3,3,3-trifluoropropylsiloxane unit. Other preferred hydroxyl-containing polymers and oligomers contain from 10 to about 100 monoorganosiloxane units per molecule of the formula $RSiO_{3/2}$ where R represents an inertly substituted or an unsubstituted hydrocarbon radical as defined hereinbefore for $R^1$. Homopolymers prepared from these monoorganosiloxane reactants are typically resinous materials.

Copolymers can be prepared using the present catalyst compositions by reacting two or more organosiloxane reactants. To obtain commercially useful products at least two of the reactants should contain an average of two or more silicon-bonded hydroxyl groups per molecule. The particular organosiloxane reactants selected and their relative concentrations will determine the physical properties of the final copolymer.

The present catalyst compositions are particularly useful for preparing block copolymers by reacting at least one hydroxyl-terminated polydiorganosiloxane (i) containing repeating units of the formula $R^2R^3SiO$ with at least one organosiloxane reactant (ii) containing repeating units of the average formula

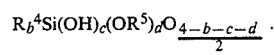

The definitions for $R^2$, $R^3$, $R^4$, $R^5$, b, c, and d appear hereinbefore.

Preferably at least 50 mol %, most preferably from 80 to 100 mol % of the hydrocarbon radicals represented by $R^2$ and $R^3$ are methyl. This preference is based on the availability of the intermediates used to prepare polydiorganosiloxane (i) and the physical properties of block copolymers containing a diorganosiloxane block having at least 50 mol % of dimethylsiloxane units. Preferred copolymers contain methylphenylsiloxane and/or methyl-3,3,3-trifluoropropylsiloxane units in addition to dimethylsiloxane units. Most preferably polydiorganosiloxane (i) is a polydimethylsiloxane.

Polydiorganosiloxane (i) can be a single species, such as the preferred polydimethylsiloxane. Alternatively, polysiloxane (i) can be a mixture of two or more polydiorganosiloxanes containing different $R^1$ and/or $R^2$ radicals, for example, a mixture of a polydimethylsiloxane and a polymethylphenylsiloxane.

Polydiorganosiloxane (i) may contain up to 2 mol % of monoorganosiloxane units. Typically these units result from impurities, usually monoorganotrihalosilanes, present in the diorganodihalosilanes used to prepare the polydiorganosiloxane.

Polydiorganosiloxane (i) typically contains an average of from 5 to about 350 repeating units per molecule. When polydiorganosiloxane (i) is a polydimethylsiloxane, it preferably contains an average of from 10 to 100 repeating units per molecule.

When $R^2$, $R^3$, and $R^4$ of polysiloxane (ii) represent the same hydrocarbon radical when b is 2 and only one type of polydiorganosiloxane is used as polydiorganosiloxane (i), all of the blocks in the final "copolymer" would be identical, thereby making it a homopolymer.

Preferably at least half, most preferably all, of the radicals represented by $R^4$ are phenyl, $R^5$ is methyl, and the average value of b in the preceding formula is from 1 to 1.3. These preferences are based on the useful combination of physical properties achieved when these polymers are reacted with a polydiorganosiloxane (i) containing at least 80 mol % of dimethylsiloxane units using the present catalyst compositions. Any radicals represented by $R^4$ which are not phenyl are preferably alkyl containing from 1 to 4 carbon atoms, vinyl, or 3,3,3-trifluoropropyl.

Polyorganosiloxane (ii) preferably contains an average of from 0.1 to 1 hydroxyl group per silicon atom, which is equivalent to a value for c in the preceding formula of from 0.1 to 1.0.

Polyorganosiloxane (ii) may contain a combination of monoorganosiloxane and diorganosiloxane units equivalent to an average value for b in the preceding formula of from 1 to 1.9. Alternatively, polyorganosiloxane (ii) can be a hydroxyl-containing polydiorganosiloxane, in which instance b would have a value of 2. Typical diorganosiloxane groups which may be present include dimethylsiloxane, diphenylsiloxane, methyl-3,3,3-trifluoropropylsiloxane, methylvinylsiloxane, and methylphenylsiloxane.

Preferred embodiments of polyorganosiloxane (ii), wherein the value of b is from 1 to 1.3, are conveniently prepared by hydrolyzing at least one monoorganotrialkoxysilane, such as phenyltrimethoxysilane, alone or in combination with at least one diorganodialkoxysilane such as phenylmethyldimethoxysilane. To facilitate preparation of the block copolymer, at least 50%, preferably at least 80%, of the original number of alkoxy groups are converted to hydroxyl groups or siloxane bonds, which is equivalent to a preferred value for d in the foregoing formula of from 0 to 0.6.

The relative amounts of polydiorganosiloxane (i) and polyorganosiloxane (ii) employed to prepare preferred block copolymers are such that the molar ratio of diorganosiloxane units in polydiorganosiloxane (i) to organosiloxane units in polyorganosiloxane (ii) is from 0.1:1 to 10:1, respectively. Preferably this ratio is from 0.7:1 to 3.5:1.

Organosiloxane homopolymers and copolymers are prepared in accordance with the present method by reacting at least one hydroxyl-containing organosiloxane reactant, as defined hereinabove, in the presence of at least one amine salt component and at least one unreacted acid component of the present catalyst compositions. The ranges for concentrations of amine salt component and acid component of the catalyst composition with respect to one another and with respect to the siloxane reactant(s) have been defined hereinbefore.

The organosiloxane reactant(s) and catalyst components are dissolved or dispersed in an inert liquid reaction medium having a boiling point of from about 50° to about 150° C. under atmospheric pressure. The term "inert" implies that the reaction medium does not react or decompose under the conditions employed to polymerize the organosiloxane reactants. The reaction medium should be a solvent for the final polymer and the reactant(s) used to prepare it. Preferably the reaction medium is a liquid aromatic hydrocarbon such as benzene, toluene or xylene that forms an azeotropic mixture with the water generated as a by-product of the condensation reaction between silicon-bonded hydroxyl groups, thereby facilitating removal of the water from the reaction mixture. Removal of water and any alcohol formed by the hydrolysis of silicon-bonded alkoxy groups is usually a prerequisite for obtaining polyorganosiloxanes of sufficiently high molecular weight to achieve commercially useful physical properties. The azeotropic mixture preferably boils from 80° to 150° C. under atmospheric pressure.

Other suitable liquid reaction media include aliphatic hydrocarbons such as hexane and halogenated hydrocarbons.

The amount of liquid reaction medium is not considered critical. Typically, the weight ratio of reaction medium to total organosiloxane reactants is from 1:1 to 3:1.

The mixture of organosiloxane reactant(s), catalyst composition and reaction medium is heated at a temperature of from 30° C. to the boiling point of the reaction mixture for a period of time required to produce a polyorganosiloxane of sufficient molecular weight that it exhibits useful properties following curing. Using toluene as the solvent, heating the reaction mixture at the boiling point for between 5 and 20 hours will usually achieve this objective.

The course of a polymerization can conveniently be followed by periodically measuring the molecular weight of the polyorganosiloxane being formed. Methods for determining molecular weight have been discussed hereinbefore. Typically, when a polydimethylsiloxane is reacted in a toluene reaction medium with a polyorganosiloxane wherein at least a major portion of the silicon atoms are bonded to phenyl radicals and the solids concentration of the reaction mixture is equal to or exceeds 40% by weight, heating of the reaction mixture is continued until a sample of the reaction mixture containing 40% by weight of dissolved solids exhibits a viscosity of from 0.04 to 0.5 Pa·s at 25° C. Continuing the polymerization reaction beyond this point may result in excessive crosslinking of the polymer and ultimately in premature gelation.

When the method and catalyst compositions of this invention are employed to prepare block copolymers using a hydroxyl-terminated polydimethylsiloxane as polydiorganosiloxane (i) and a partially or completely hydrolyzed phenyltrialkoxysilane as polyorganosiloxane (ii), it has been found that while both of these reactants are soluble in toluene, the resultant solutions are incompatible until they have at least partially coreacted to form a block copolymer. Not until this time can a clear film be formed from the reaction mixture. By coating a sample of this reaction mixture on a smooth, horizontal surface such as a glass microscope slide, evaporating volatile materials at ambient or elevated temperatures and observing the clarity of the resultant film, it is possible to determine whether the reaction has progressed sufficiently to form a block copolymer. Once a clear film is obtained, it is usually advantageous to continue heating the reaction mixture for an additional one to three hours. This is usually sufficient to increase the physical properties of the cured copolymer to the level required for most end use applications.

The products of the present method are heat curable hydroxylated organosiloxane homopolymers and copolymers. These products are useful as coating materials or for other applications which advantageously utilize the unique properties of polyorganosiloxanes. These applications are thoroughly discussed in the prior art pertaining to polyorganosiloxanes.

If it is desired to store a solution containing a hydroxylated polyorganosiloxane prepared using the present catalyst compositions for a period of time longer than about 24 hours under ambient conditions prior to curing it, or to concentrate the solution by distilling off a portion of the volatile materials, it is usually desirable to add a stabilizer for the purpose of inhibiting subsequent gelation of the polymer. Suitable stabilizers include the chromium, cobalt, zinc, and rare earth salts of carboxylic acids containing from 4 to 12 or more carbon atoms.

The chromium, zinc, and cobalt salts of octanoic acid are preferred stabilizers and are typically employed at concentrations of from 1 to about 50 ppm based on the weight of polyorganosiloxane. At concentrations above about 50 ppm, the stabilizers may function as catalysts for premature curing of the polymer.

The hydroxyl-containing polyorganosiloxanes prepared using the method and catalyst compositions of this invention can be resinous or elastomeric. The elongation and other physical properties which distinguish elastomeric from resinous polyorganosiloxanes are determined, at least in part, by the average degree of polymerization of the polymer molecules, the nature of hydrocarbon groups bonded to silicon, and the extent to which the polymer is crosslinked. For example, block copolymers containing more than about 80 mol % of dimethylsiloxane blocks exhibiting an average degree of polymerization greater than about 200 and a relatively low degree of crosslinking exhibit values of elongation and tensile strength that are typical of elastomeric polydimethylsiloxanes. By comparison, a copolymer containing less than 60 mol % of relatively low molecular weight dimethylsiloxane blocks in combination with blocks formed from a hydroxylated polysiloxane containing silicon-bonded phenyl groups would, for the purpose of this invention, be considered a resin, in that the recoverable elongation of the cured polymer would be less than 150% and the tensile strength would be greater than about 2.5 megapascals (MPa).

The hydroxylated polyorganosiloxanes prepared using the catalyst compositions of this invention can be cured by heating them at temperatures of from 30° to 200° C. in the presence of catalysts which promote the condensation of silicon-bonded hydroxyl groups. Useful catalysts for this reaction are discussed in the aforementioned U.S. Pat. No. 3,308,208, which is hereby incorporated in its entirety by reference.

When hydroxylated polyorganosiloxanes are reacted under anhydrous conditions with at least an equivalent amount of at least one monoorganotrifunctional silane containing three alkoxy, acetoxy or ketoxime groups per molecule, the resultant products are curable at ambient temperature in the presence of atmospheric moisture. For the purpose of discussing curing of polyorganosiloxanes, "equivalent" is defined as one molecule of silane for each hydroxyl group present on the polyorganosiloxane.

The monoorganotrifunctional silanes can be represented by the general formula $R^6SiY_3$ where $R^6$ represents a monovalent hydrocarbon radical and Y represents an alkoxy, acetoxy or ketoxime group. Silanes corresponding to this formula are known compounds, as are room temperature curable reaction products of these silanes with hydroxyl-containing polyorganosiloxanes.

Typical silanes which can be reacted with the aforementioned hydroxylated polyorganosiloxanes include, for example, ketoxime silanes such as
$CH_3Si[ON=C(CH_3)_2]_3$,
$CH_3Si[ON=C(CH_2CH_3)(CH_3)]_3$,
$CH_3CH_2Si[ON=C(CH_3)(CH_2CH_3)]_3$,
$(CH_3)_3CSi[ON=C(CH=CH_2)(C_6H_5)]_3$ and others disclosed in U.S. Pat. No. 3,189,576; acetoxysilanes such as methyltriacetoxysilane, ethyltriacetoxysilane, propyltriacetoxysilane, butyltriacetoxysilane, phenyltriacetoxysilane, pentyltriacetoxysilane, and vinyltriacetoxysilane; and alkoxysilanes such as methyltrimethoxysilane, ethyltrimethoxysilane, propyltrimethoxysilane, butyltrimethoxysilane, phenyltrimethoxysilane, pentyltrimethoxysilane, vinyltrimethoxysilane, methyltriethoxysilane, ethyltriethoxysilane, phenyltriethoxysilane, butyltripropoxysilane, pentyltriisopropoxysilane, vinyltributoxysilane, vinyltripentoxysilane, methyltripentoxysilane, ethyltributoxysilane, methylethoxydimethoxysilane, methylmethoxydiethoxysilane, ethylmethoxydiethoxysilane, and phenyltripropoxysilane. Mixtures of two or more different types of silanes can also be used.

The catalyst compositions of this invention are useful for preparing polyorganosiloxanes from organosiloxane reactants other than the preferred combinations discussed in detail hereinbefore and disclosed in the accompanying examples. The only requirement is that the reaction mixture from which the polymer is prepared contains at least one organosiloxane reactant containing an average of more than one, preferably at least two, silicon-bonded hydroxyl groups per molecule. The organosiloxane reactants can include two or more polydiorganosiloxanes containing different hydrocarbyl groups bonded to silicon. For example, one of the reactants may be a polydimethylsiloxane and the other a polymethylphenylsiloxane or a polymethyl-3,3,3-trifluoropropylsiloxane. Alternatively, a polydiorganosiloxane (i) component can be reacted with a first polysiloxane (ii) containing phenylsiloxy units and a second polysiloxane (ii) component containing methylsiloxy units.

The following examples disclose preferred embodiments of the present method and catalyst compositions and should not be interpreted as limiting the scope of the accompanying claims. All parts and percentages are by weight unless otherwise indicated and Ph represents the phenyl radical.

EXAMPLE 1

This example describes the preparation of an organosiloxane block copolymer using one of the preferred catalyst compositions of the present invention.

A glass reactor equipped with a mechanically driven stirrer, water cooled reflux condenser and a Dean-Stark trap to divert and store a portion of the condensate returning to the reactor was charged with 375 parts of a 60% solution in toluene of a partially hydrolyzed phenyltrimethoxysilane having repeating units corresponding to the average formula $$PhSi(OH)_{0.48}(OCH_3)_{0.12}O_{1.20},$$

275 parts of a hydroxyl-terminated polydimethylsiloxane exhibiting a viscosity of $8 \times 10^{-5} m^2/s$ at 25° C., 905 parts of toluene, 0.29 part of a salt solution prepared by combining equimolar amounts (as 10% by weight aqueous solutions) of tetramethylguanidine and trifluoromethanesulfonic acid (equivalent to 58 parts of salt per million parts of total organosiloxane reactants) and 0.17 parts of a 10% aqueous solution of trifluoromethanesulfonic acid (equivalent to 34 parts of acid per million parts of organosiloxane reactants). The molar ratio of dimethylsiloxane units to phenylsiloxy units in the reaction mixture was 2.3:1, respectively.

The contents of the reactor were heated at the boiling point for 6½ hours, at which time 300 parts of reaction medium were collected in the Dean-Stark trap and removed together with about 7.5 parts of water that had collected during the course of the reaction. The solids content of the reaction mixture was about 40% by weight. Heating was continued for an additional 5½ hours, during which time an additional 0.4 part of water collected in the trap. At this time, 0.17 part of a cobalt octoate solution in a liquid hydrocarbon containing 6% by weight of cobalt was added as a stabilizer to inhibit gelation of the polymer. Heating was continued for an additional 4½ hours, at which time a sample of the reaction mixture formed a clear film when coated on a glass microscope slide. The reaction mixture was then concentrated by removing 596 parts of volatile reaction medium by distillation. After being heated for a total of 16.5 hours, the final solution contained 56% by weight of solids and exhibited a viscosity of 0.924 Pa·s at 25° C. When diluted to a solids content of 40% by weight, the viscosity of the aforementioned final solution was 0.075 Pa·s.

A room temperature curable polyorganosiloxane composition was prepared by combining 200 parts of the final polymer solution with 20 parts of methyltrimethoxysilane, 0.5 parts of diisopropoxy bis(ethylacetoacetato)titanium and 0.25 part of a liquid hydrocarbon solution of cobalt octoate containing 6% by weight of cobalt. The resultant mixture was stirred briefly to obtain a homogeneous composition and allowed to remain in a closed container in the absence of moisture for one week. Samples of this composition were cured by exposing a 0.06 inch (0.15 cm.)-thick layer of the composition to a temperature of 25° C. and a relative humidity of 50% for one week, at which time the samples exhibited a tensile strength of 4.3 megapascals (MPa) and a maximum elongation of 98%.

EXAMPLE 2

This example demonstrates the preparation of organosiloxane block copolymers using various amine salts in combination with either trifluoromethanesulfonic acid or tetrafluoroethanesulfonic acid.

Organosiloxane block copolymers were prepared as described in the foregoing Example 1 using the types and amounts of organosiloxane reactants disclosed in that example. The reaction medium was 900 parts of toluene and from 0.17 to 0.34 part of a solution of zinc octoate in a liquid hydrocarbon containing 8% by weight of zinc was used as a stabilizer in place of the cobalt octoate of Example 1.

The salts were prepared by combining of 10% by weight aqueous solutions containing equimolar amounts of the amines and acids specified in Table 1, which also lists the amount of each salt used, the type and amount of acid that was combined with the salt to form the catalyst composition and the tensile strength and elongation of the polymer following conversion to a room temperature cured material using the procedure described in Example 1. The titanium compound disclosed in Example 1 was used as the curing catalyst and no cobalt octoate was added together with the titanium compound.

The viscosity measurements reported in Table 1 were obtained using a 40% by weight solution of the copolymer at a temperature of 25° C.

Amines—Tetramethylguanidine (TMG) t-butylamine (TBA)

Acids—Trifluoroacetic acid (TFA) Trifluoromethanesulfonic acid (TFMS) Tetrafluoroethanesulfonic acid (TFES) Sulfuric acid ($H_2SO_4$)

In a control example, trifluoroacetic acid was employed as the free acid component in place of the sulfuric or fluoroalkanesulfonic acid of the present invention.

TABLE 1

| Salt Components | | Amount of Salt | Free Acid | Viscosity | Tensile Strength[1] | Elongation[1] |
| --- | --- | --- | --- | --- | --- | --- |
| Amine | Acid | (ppm)[2] | (ppm)[2] | Pa.s, 40% sol. | (MPa) | (%) |
| TMG | TFA | 172 | TFMS (154) | 0.106 | 4.4 | 140 |
| TBA | TFMS | 86 | TFMS (40) | 0.173 | 5.5 | 57 |
| TMG | $H_2SO_4$ | 171 | $H_2SO_4$ (266) | 0.130 | 3.2 | 107 |
| TMG | TFES | 114 | TFES (126) | | | |
| Control | | | | | | |
| TMG | TFA | 228 | TFA (790)[3] | 0.06 | 4.1 | 153 |

[1]Measured following addition of from 15 to 20 parts methyltrimethoxysilane, from 0.4 to 0.5 parts diisopropoxy bis(ethylacetoacetato)titanium and curing as disclosed in Example 1. Units of tensile strength are megapascals (MPa).
[2]ppm - parts of salt or acid per million parts of organosiloxane reactants.
[3]Amount of trifluoroacetic acid added included 1.25 parts of a 10% by weight aqueous solution and 0.27 part of the undiluted acid, equivalent to a total of 0.395 parts (790 ppm) of the undiluted acid.

The control copolymer prepared using trifluoroacetic acid in place of the perfluorinated alkanesulfonic acids of this invention exhibited a lower viscosity value prior to reaction with the methyltrimethoxysilane. In addition, the control process required more than 20 times the amount of acid required using the trifluoromethanesulfonic acid catalyst of Example 1, and the water which distilled during the polymerization was very acidic, which indicates that this catalyst would be too corrosive for use in metal reactors.

The control process was conducted by adding 0.57 g. of a 10% aqueous solution of trifluoroacetic acid to the initial reaction mixture. An addition 0.29 g. was added after 3 hours when the rate water evolution decreased, followed by 4–0.1 g. portions of concentrated (100%) trifluoroacetic acid during the course of the polymerization to increase the rate of water evolution. By comparison, a neutral distillate was produced by the reaction mixture catalyzed using a preferred catalyst composition, namely the combination of t-butylammonium trifluoromethanesulfonate and free trifluoromethanesulfonic acid. A sample of steel wool placed in the initial reaction mixture containing this preferred catalyst did not exhibit any rust or other signs of corrosion following completion of the polymerization. This indicates that the reaction mixture will not corrode iron or steel reactors and associated processing equipment.

EXAMPLE 3

This example demonstrates the variations in tensile strength, elongation and hardness of cured block copolymers that are achieved by varying the ratio of dimethylsiloxane to phenylsiloxane units in cured block copolymers prepared in accordance with the method of this invention.

The polymers were prepared by charging a nitrogen-filled reactor with 800 parts of toluene and the organosiloxane reactants employed in Example 1 in the amounts indicated in the following Table 2. Tetramethylguanidine trifluoromethanesulfonate was formed in-situ by adding 0.0015 part of tetramethylguanidine as a 10% by weight aqueous solution to the initial reaction mixture, heating for one hour at the boiling point while collecting the by-product water, adding toluene as required to maintain a clear solution and then adding 0.006 or 0.004 part of trifluoromethanesulfonic acid as a 10% aqueous solution. The amounts of amine and acid added were equivalent to the concentrations of salt and free acid shown in Table 2. The concentrations are based on the weight of organosiloxane reactants.

Following addition of the trifluoromethanesulfonic acid solution the reaction mixtures were heated with removal of by-product water by azeotropic distillation until a sample of the reaction mixture formed a clear film when coated onto a glass microscope slide, and a ¼ inch (0.6 cm)-wide strip of the cured film could be elongated to between 1¼ and 1½ times its original length without breaking. The films were cured by heating the coated glass slides on a commercial laboratory-type, electrically heated "hot plate" for 12 minutes using the "medium" thermostat setting and for an additional 12 minutes using the "high" thermostat setting. Additional trifluoromethanesulfonic acid was added during the polymerization reaction as required to maintain approximately the initial reaction rate, as measured by the rate at which water collected in the Dean-Stark trap. Once acceptable cured films were obtained, as determined using the foregoing test, the reaction mixtures were stabilized using 0.03 part of solubilized chromium octoate or cobalt octoate as the stabilizer. The stabilizer was dissolved in a hydrocarbon solvent and contained 6% by weight of the metal. Following addition of the stabilizer, the reaction mixtures were concentrated by distillation of solvent and other volatile materials to achieve a solids concentration of from 50 to 54% by weight.

Room temperature curable compositions were prepared by combining the final reaction mixture with 6%, based on the weight of the final reaction mixture, of methyltrimethoxysilane, 20 parts per million parts of reaction mixture of a mixture of solubilized rare earth octoates in an unspecified liquid hydrocarbon and containing 6% of rare earths, an amount of solubilized cobalt naphthenate (in a liquid hydrocarbon) equivalent to 18 ppm of cobalt and 0.12% by weight of either tetrabutyl titanate or diisopropoxy bis(ethylacetoacetato)titanium. The resultant compositions were molded and cured as described in Example 1 and samples were tested for tensile strength, elongation and hardness. Hardness measurements were obtained using a Shore D durometer and the procedure described in ASTM test method D-1674.

TABLE 2

| Sample No. | 1 | 2 | 3 | 4 | 5 | 6 |
|---|---|---|---|---|---|---|
| Weight ratio of dimethylsiloxane/phenylsiloxane reactants | 55/45 | 55/45 | 70/30 | 70/30 | 45/55 | 45/55 |
| Molar ratio of dimethylsiloxane/phenylsiloxane units | 2.13/1 | 2.13/1 | 4.07/1 | 4.07/1 | 1.42/1 | 1.42/1 |
| Salt concentration (ppm) | 59 | 59 | 54 | 54 | 59 | 59 |
| Free acid concentration (ppm) | 131 | 131 | 69 | 69 | 75 | 75 |
| Tensile strength (MPa) | 2.76 | 3.67 | 1.84 | 1.69 | 8.42 | 8.26 |
| Elongation (%) | 88 | 95 | 345 | 344 | 30 | 35 |
| Hardness (Shore D) | 30 | 26 | 14 | 12 | 34 | 34 |

Samples 1, 3 and 5 were cured using diisopropoxy bis(ethylacetoacetato)titanium (0.12%); samples 2, 4 and 6 were cured using tetrabutyl titanate (0.12%).

The foregoing data demonstrate the increase in tensile strength and hardness and the decrease in elongation observed as the relative concentration of phenylsiloxane units in the block copolymer is increased. The optimum combination of these properties is achieved using a 2.13:1 molar ratio of dimethylsiloxane units to phenylsiloxane units.

EXAMPLE 4

This example demonstrates (A) the preparation of a polydimethylsiloxane using a preferred salt component of the present catalyst compositions and (B) the inability of the salt alone to form a useful block copolymer.

(A) A reactor equipped as described in example 1 was charged with 500 parts of a hydroxyl-endblocked polydimethylsiloxane having a viscosity of $8.0 \times 10^{-5}$ m$^2$/s at 25° C., 150 parts of toluene and 0.29 part of a 10% by weight aqueous solution of tetramethylguanidinium trifluoromethanesulfonate, equivalent to 58 parts of salt per million parts of organosiloxane reactant. The resultant mixture was heated at the boiling point for 2½ hours with stirring, during which time 4 parts of water were collected and the vortex caused by the rotating stirrer gradually disappeared due to the increasing viscosity of the reaction mixture. At this time the reaction mixture was allowed to cool to 75° C. and 375 parts of toluene were added to the reactor. Following an additional 2.5 hours of heating at the boiling point 0.15 part of tetramethylguanidinium trifluoromethanesulfonate (as a 10% aqueous solution) was added to the reaction mixture and heating was continued for 30 minutes. The very viscous reaction mixture was cooled and divided in half. One half was diluted with 335 parts of toluene, equivalent to a solids content of 30% by weight. This solution was heated at the boiling point for 1.5 hours, at which time 0.15 part of tetramethylguanidinium trifluoromethanesulfonate solution was added and heating was continued for another hour. The reaction mixture was then diluted to a solids content of 20% by weight using 400 parts of toluene and heated to the boiling point for an additional two hours.

The viscosity of the final 20% polymer solution was $1.05 \times 10^{-3}$ m$^2$/s at 25° C. The initial polymer, without any solvent present, exhibited a viscosity of $0.08 \times 10^{-3}$ m$^2$/s at 25° C., which indicates that the present salts are effective catalysts for polymerizing polydimethylsiloxanes in the absence of additional acid.

(B) An attempt was made to carry out a copolymerization as described in Example 1 using only the salt component of the disclosed catalyst composition. The initial reaction mixture contained 368 g. of a 61% toluene solution of hydrolyzed phenyltrimethoxysilane, 275 g. of a hydroxyl endblocked polydimethylsiloxane exhibiting a viscosity of 0.4 Pa·s at 25° C., 5 parts of a 10% aqueous solution of tetramethylguanidinium trifluoromethanesulfonate, and 467 parts of toluene. The resultant reaction mixture was heated at the boiling point for 4½ hours, during which time 10 parts of water collected in the Dean Stark trap. At the end of this time period a sample of the reaction mixture was placed on a glass microscope slide. The sample exhibited a semi-solid polymer phase and a separate liquid phase. This indicated that the two reactants were not copolymerizing to form the single phase solubilized copolymer obtained in Example 1. The salt concentration was 0.5 part per 500 parts of organosiloxane reactants, or 0.1% by weight (1000 ppm), which is nearly 20 times the amount of salt employed in Example 1.

EXAMPLE 5

This example demonstrates the inability of trifluoromethanesulfonic acid, a preferred acid component of the present catalyst compositions, to form a block copolymer of as high molecular weight as can be achieved using the combination of the acid with one of the present salts.

A glass reactor equipped as described in Example 1 was charged with 220 parts of partially dried solid hydrolyzed phenyltrimethoxysilane (equivalent to 215 parts of dry solid), 285 parts of a hydroxyl endblocked polydimethylsiloxane exhibiting a viscosity of $8.0 \times 10^{-5}$ m$^2$/s, 10 parts of deionized water, 700 parts of toluene, 130 parts of xylene, and 0.1 part of a 10% aqueous solution of trifluoromethanesulfonic acid. The resultant mixture was heated at the boiling point for 3½ hours, during which time 21.5 parts of water were collected. A film formed by coating a glass microscope slide with a sample of the reaction mixture appeared acceptable. The reaction mixture was then stabilized by adding 0.3 part of a liquid hydrocarbon solution of chromium octoate containing 8% by weight of chromium and removing 360 parts of reaction medium by distillation. A 39.7 weight % solution of the final polymer exhibited a viscosity of $11.5 \times 10^{-3}$ Pa·s at 25° C. The viscosity of a 40 weight % solution of the polymer prepared as described in Example 1 using both the acid and salt components of the present catalysts was $75 \times 10^{-3}$ Pa·s at 25° C. The amounts of water generated during both of the aforementioned polymerization reactions were equivalent after compensating for the 10 parts of water added to the control reaction (11.5 parts for the control compared with 8 parts for Example 1). Assuming that the ratio between the amount of water generated and the amount recovered in the Dean Stark trap are equivalent for both reactions, the viscosity of the polymer produced using the acid alone should have been at least equivalent to the viscosity of the polymer disclosed in Example 1 of this application.

The ability of trifluoromethanesulfonic acid to rapidly polymerize a hydroxyl endblocked polydimethylsiloxane was demonstrated by reacting 500 parts of the polydimethylsiloxane of Example 1 as a solution in 125 parts of toluene. This reaction mixture was heated to the boiling point, at which time 0.07 part of a 10% aqueous solution of trifluoromethanesulfonic acid was added. Heating was continued for 1 hour and 20 minutes, at which time 4.5 parts of water had been collected and the reaction mixture became sufficiently viscous that it coated the wall of the reactor. The viscosity of the polymer solution was estimated to be about 5,000 Pa·s.

EXAMPLE 6

This example demonstrates preparation of a block copolymer in accordance with the present method using a trimethylsiloxy endblocked polydimethylsiloxane as one of the reactants.

A block copolymer was prepared using the procedure and apparatus described in Example 1. The reactor was charged with 158 parts of a 60% solution in toluene of the partially hydrolyzed phenyltrimethoxysilane, salt solution (0.29 part) and acid solution (0.17 part) described in Example 1, 500 parts of toluene and 143 parts of a trimethylsiloxy endblocked polydimethylsiloxane exhibiting a viscosity of 72 Pa·s at 25° C. The resultant mixture was heated at the boiling point for one hour, during which time 2.5 parts of water were collected. A sample from the reaction mixture formed an acceptable, clear film when placed on a glass microscope slide and cured as described in Example 3. At this time 250 parts of reaction medium were removed by distillation, 0.17 part of a solution of zinc octoate in a liquid hydrocarbon containing 8% of zinc was added and the resultant mixture was heated to the boiling point for an additional 45 minutes, at which time 42 parts of reaction medium were removed by distillation. A 40% by weight solution of the reaction product exhibited a viscosity of 0.021 Pa·s at 25° C.

The fact that clear, cured films were formed indicated that the two siloxane reactants had formed a copolymer. It is believed that formation of such a copolymer required hydrolysis of siloxane bonds in the initial trimethylsiloxy endblocked polydimethylsiloxane. The resultant hydroxyl endblocked molecules subsequently reacted with the hydrolyzed phenyltrimethoxysilane to form a copolymer.

That which is claimed is:

1. A catalyst composition for preparing polyorganosiloxanes by the reaction of at least one polyorganosiloxane containing a plurality of silicon-bonded hydroxyl groups, said catalyst composition consisting essentially of (1) at least one salt derived from equimolar amounts of an organic amine containing at least one primary, secondary or tertiary nitrogen atom and an acid selected from the group consisting of mono- and polyfunctional carboxylic acids, mono- and polyfunctional organosulfonic acids, phosphoric acid and sulfuric acid, and (2) at least one unreacted acid selected from the group consisting of fluorinated alkanesulfonic acids and sulfuric acid and where the weight ratio of salt (1) to unreacted acid (2) is from 1:30 to 50:1, respectively.

2. A composition according to claim 1 where said salt is derived from a monoalkylamine or a 1,1,3,3-tetraalkylguanidine wherein the alkyl groups of the monoalkylamine and tetraalkylguanidine contain from 1 to 8 carbon atoms.

3. A composition according to claim 2 where the monoalkylamine is t-butylamine and the 1,1,3,3-tetraalkylguanidine is 1,1,3,3-tetramethylguanidine.

4. A composition according to claim 1 where said salt is derived from sulfuric acid, a polyfluorinated carboxylic acid, or a polyfluorinated alkanesulfonic acid.

5. A composition according to claim 4 where said polyfluorinated carboxylic acid is trifluoroacetic acid and the polyfluorinated alkanesulfonic acid is trifluoromethanesulfonic acid or tetrafluoroethanesulfonic acid.

6. A composition according to claim 1 where said unreacted acid is sulfuric acid.

7. A composition according to claim 1 where said unreacted acid is a fluorinated alkanesulfonic acid represented by the formula $R_fSO_3H$ where $R_f$ represents a perfluoroalkyl radical containing from 1 to 12 carbon atoms, a $H(CF_2)_dCF_2$ radical or a $F(CF_2)_dCFHCF_2$—radical and d is 0, 1, or 2.

8. A composition according to claim 7 where said fluorinated alkanesulfonic acid is trifluoromethanesulfonic acid or tetrafluoroethanesulfonic acid.

9. A composition according to claim 1 where the weight ratio of (1) to (2) is from 1:3 to 3:1, respectively.

* * * * *